United States Patent [19]

Tanaka et al.

[11] Patent Number: 5,333,054
[45] Date of Patent: Jul. 26, 1994

[54] APPARATUS FOR REDUCING NOISE IN A VIDEO SIGNAL BY PROCESSING A LUMINANCE AND CHROMINANCE COMPONENT

[75] Inventors: Seiichi Tanaka; Masahiko Mawatari, both of Yokohama, Japan

[73] Assignee: Kabushiki Kaisha Toshiba, Kawasaki, Japan

[21] Appl. No.: 987,829

[22] Filed: Dec. 9, 1992

[30] Foreign Application Priority Data

Dec. 10, 1991 [JP] Japan .................................. 3-326019

[51] Int. Cl.$^5$ .............................................. H04N 9/78
[52] U.S. Cl. .................................. 348/666; 348/669; 348/670
[58] Field of Search ............... 358/31, 39, 40, 105, 358/37, 21 R, 36, 166, 167; H04N 9/77, 9/78

[56] References Cited

U.S. PATENT DOCUMENTS 4,870,481 9/1989 Kawamata .............................. 358/31
5,146,318 9/1992 Ishizuka ................................ 358/31

FOREIGN PATENT DOCUMENTS 0163164 12/1985 European Pat. Off. .
6471287 3/1989 Japan .
2013090 1/1990 Japan .
440795 2/1992 Japan .
4240991 8/1992 Japan .

OTHER PUBLICATIONS

1989 National Convention Record of ITEJ; T. Miyazaki et al.; Jul. 1989, pp. 215–216.

*Primary Examiner*—James J. Groody
*Assistant Examiner*—Sherrie Hsia
*Attorney, Agent, or Firm*—Cushman, Darby & Cushman

[57] ABSTRACT

A video signal processing apparatus capable of improving a signal to noise ratio of a video signal by providing for a first luminance/chrominance separation circuit for still pictures and a second luminance/chrominance separation circuit for moving pictures. Color disturbances on the screen can be avoided by switching between a parallel configuration and a serial configuration of the first and second separation circuits without generating differences in signal delay times.

9 Claims, 10 Drawing Sheets

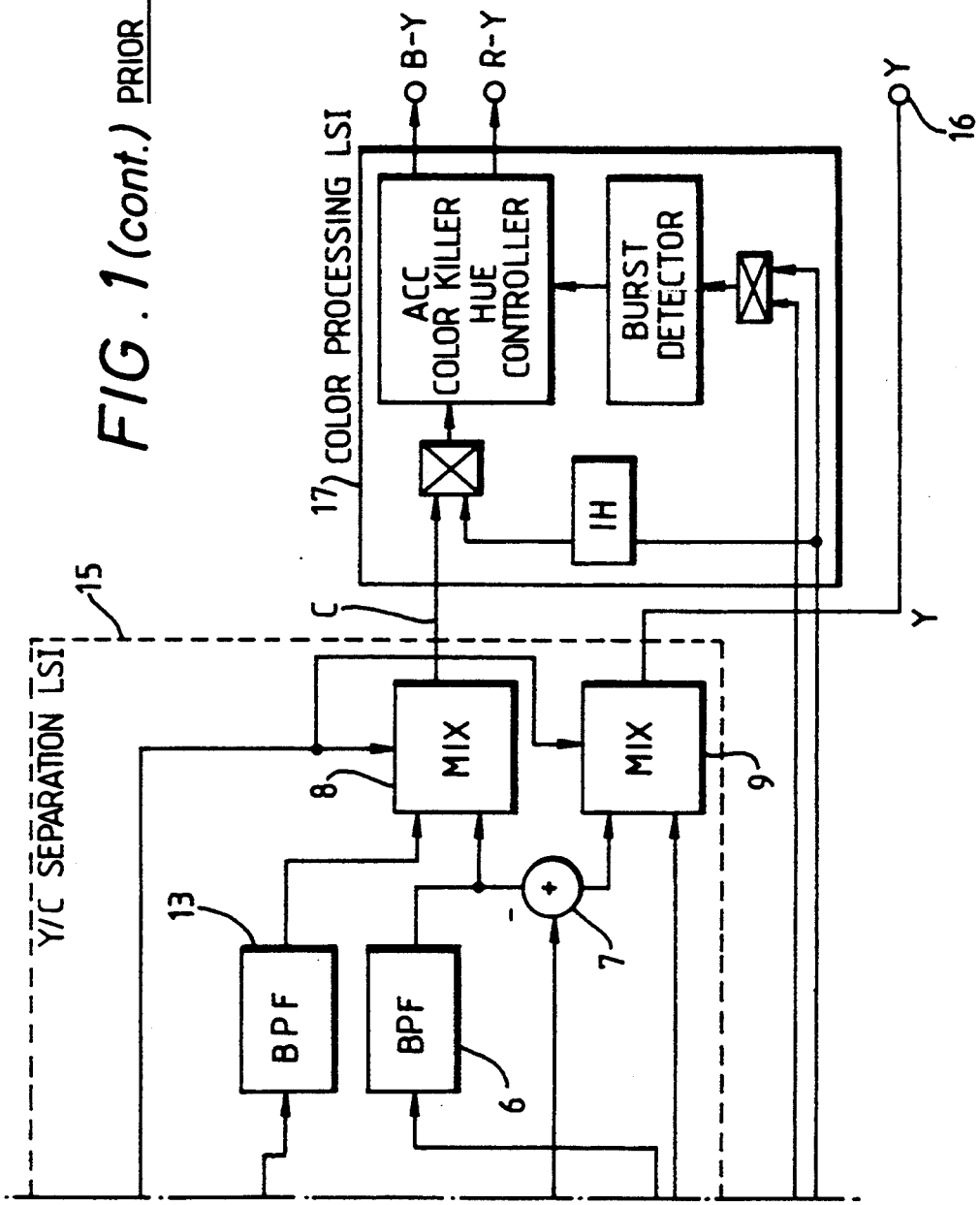
FIG. 1(cont.) PRIOR ART

APPARATUS FOR REDUCING NOISE IN A VIDEO SIGNAL BY PROCESSING A LUMINANCE AND CHROMINANCE COMPONENT

FIELD OF THE INVENTION

The present invention relates generally to a video signal processing apparatus, and more particularly, to a video signal processing apparatus for performing a motion adaptive separation of a luminance signal and chrominance signal with a good noise reduction property.

BACKGROUND OF THE INVENTION

In order to improve a luminance signal and chrominance signal separation (hereinafter referred to as Y/C separation) property, TV sets and/or video tape recorders a three-dimensional Y/C separation circuit adaptively responsive to the motion of a picture pattern. In these motion adaptive Y/C separation circuits, a detection of the motion of picture pattern and an operation to adapt thereto have been large factors in improving the Y/C separation property. The motion picture pattern is detected according to a frame difference (frame non-correlation) of successive frames of an input composite video signal. While the Y/C separation is carried out using a line correlation of lines in a picture pattern determined as a moving picture pattern (hereinafter, referred to as moving picture) and using the frame correlation between two frames of a picture pattern determined as a still picture.

Referring now to FIG. 1, a conventional video signal processing apparatus will be briefly described. The conventional apparatus is provided with such a motion adaptive Y/C signal separation circuit 15. The circuit 15 in FIG. 1 is shown as an LSI circuit, for example, which is discussed in a report titled as "Development of Three-Dimensional YC Processing LSI" by Miyazaki et al at "1989 National Meeting of the Television Society, pp. 215–216.

The composite video signal (hereinafter referred to as NTSC signal) input through the input terminal 1 is applied to an A/D converter 2, then converted into a digital signal. Thus the digital composite video signal is applied to a moving picture Y/C separation circuit 3 in the Y/C separation LSI 15. The moving picture Y/C separation circuit 3 takes continuous three line signals using two 1 H delay circuits 4 and 5 ("H" means the horizontal period) to perform a Y/C separation for moving pictures. That is, the moving picture Y/C separation circuit 3 first detects a vertical correlation of an image from horizontal low band components of the continuous three lines, and then, based on the vertical correlation, mixes two comb filter outputs to yield vertical high band components (line non-correlative components) for three adjacent lines. The vertical high band components extracted by the moving picture Y/C separation circuit 3 are applied to a subtracter 7 and a mixing circuit (hereinafter referred to as MIX) 8 as the chrominance signals of moving pictures (hereinafter referred to the moving picture C), after removing the color carrier band components by a band-pass filter (hereinafter referred to as BPF) 6. The subtracter 7, into which the output from the 1 H delay circuit 4 is also applied, subtracts the moving picture C from the 1 H delayed NTSC signal, so that a luminanee signal Y1 for moving pictures (hereinafter referred to as moving picture Y1) is separated as a remaining output of the subtractor 7. The moving picture Y1 is then applied to another MIX 9.

The NTSC signal delayed by 1 H period in the 1 H delay circuit 4 is applied to a still picture Y/C separation circuit 12 and also to a one-frame delay circuit 10 for delaying signals therethrough for 525 H (i.e., one-frame period). The one-frame delay circuit 10 also applies the delayed signal to another input of the still picture Y/C separation circuit 12 as well as to another one-frame delay circuit 11. Thus the still picture Y/C separation circuit 12 is simultaneously supplied with two NTSC signals, i.e., the present frame NTSC signal from the 1 H delay circuit 4 and a one-frame delayed NTSC signal from the one-frame delay circuit 10. The still picture Y/C separation circuit 12 separates a luminance signal for still pictures (hereinafter referred to as still picture Y) by adding those two input signals and a chrominance signal component (frame non-correlative component) for still pictures by subtracting those two input signals. The still picture Y separated in the still picture Y/C separation circuit 12 is applied to the MIX 9 and the chrominance signal component (frame non-correlative component) is applied to the MIX 8 as the still picture chrominance signal (hereinafter referred to as still picture C) after processed a band limitation through a BPF 13.

The output from the 1 H delay circuit 4, i.e., 1 H delayed signal and the outputs from the one-frame delay circuits 10 and 11, i.e., a one-frame delayed signal and a two-frame delayed signal, are also supplied to a motion detection circuit 14. The motion detection circuit 14 detects the largest one of the moving signals detected based on a difference of one frame and the moving signal detected based on a difference between two frames t and provides the signal o the MIXs 8 and 9. The MIX 9 is supplied with the moving picture Y and the still picture Y and by mixing both of them at a ratio corresponding to the moving signal, provides the luminance signal Y to the output terminal 16. The MIX 8 is supplied with the moving picture C and the still picture C and then mixes both of them at a ratio corresponding to the moving signal to provide the chrominance signal C to the color processing LSI 17.

As described above, the moving picture Y/C separation circuit 3 separates the moving picture C and the moving picture Y through the Y/C separation using the three lines correlation while the still picture Y/C separation circuit 12 separates the still picture C and the still picture Y through the Y/C separation using the frame correlation.

Adoption of such a Y/C separation (motion adaptive Y/C separation) using the frame correlation enables it to improve the Y/C separation property higher than that using the intra-frame correlation. Further, the inter-frame operation for separating the still picture Y and the still picture C composes the frame non-cyclic noise reduction using the non-correlativity of noise. That is, the still picture Y/C separation circuit 12 has such merits that it carries out the Y/C separation and at the same time, reduces frame non-correlative noise and improves the S/N by 3 dB.

However, if the receiving condition for TV broadcast signals is lowered and the S/N of input composite video signals becomes remarkably decreased, the S/N improving effect of 3 dB is still insufficient. In this case, the noise may be erroneously detected as a signal representing a motion picture and the S/N improving effect by the still picture Y/C separation circuit drops. If it is tried to improve the S/N by performing the noise reduction by the frame operation after the frame Y/C separation, increases in the frame memory capacity and the size of the large scale circuit integration can result.

So, if the S/N of the input composite video signal has been deteriorated, the S/N may be recovered by a cyclic noise reduction circuit for the frame operation in the still picture Y/C separation, formed by a series connection of the moving picture Y/C separation circuit and the still picture Y/C separation circuit. In the frame cyclic noise reduction circuit, the S/N improving effect of 8 dB can be attained by setting constants properly. If the S/N is relatively satisfactory, sufficient Y/C separation property is obtained when the moving picture and still picture Y/C separation circuits are connected in parallel with each other as shown in FIG. 1. Further, if the S/N is relatively worse, a cyclic noise reduction circuit should be composed by performing the frame operation of the still picture Y/C separation circuit by connecting the moving picture and still picture Y/C separation circuits in parallel with each other.

However, a signal delay time for the moving picture Y/C separation circuit and the still picture Y/C separation circuit connected in series is longer than that those connected in parallel with each other. Because of this difference in signal delay times, phases of chrominance signal and luminance signal become discontinuous when the connecting state of the Y/C separation circuits is changed. As a result, such problems as color disordering, uneven coloring, color vanishing, etc. are.

PROBLEMS TO BE SOLVED BY THE INVENTION

As described above, conventional video signal processing apparatus have problems such as color shading, color vanishing, etc., appearing on screens because of differences in signal delay times when the connection of the moving picture Y/C separation circuit and the still picture Y/C separation circuit was changed between the parallel connection to the series connection in order to promote the S/N improving effect.

SUMMARY OF THE INVENTION

It is, therefore, an object of the present invention to provide a video signal processing apparatus capable of obtaining a sufficient Y/C separation property and an S/N improving effect by making the connection of the moving picture Y/C separation circuit and the still picture Y/C separation circuit changeable therebetween without causing any color disturbance on the screen.

The video signal processing apparatus according to the present invention is provided with an input terminal for receiving a composite video signal, a first separation circuit for separating a first luminance signal and a first chrominance signal in response to a correlation among n frames (n is a positive integer) of the composite video signal, a second separation circuit for separating a second luminance signal and a second chrominance signal in response to an in-frame correlation of the composite video signal, a motion detection circuit for detecting a motion of the composite video signal in response to a non-correlation among m frames (m is a positive integer) of the composite video signal to provide a motion detection signal therefrom, a first mixing circuit for mixing the first and second luminance signals at a mixing ratio responsive to the motion detection signal to provide a third luminance signal therefrom, a second mixing circuit for mixing the first and second chrominance signals at a mixing ratio responsive to the detection signal to provide a third chrominance signal therefrom, a noise reduction circuit for reducing noises in the second luminance and the second chrominance signal in response to the n-frame correlation, and a selection circuit for selectively outputting the set of the third luminance signal and the third chrominance signal or the set of the fourth luminance signal and the fourth chrominance signal.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
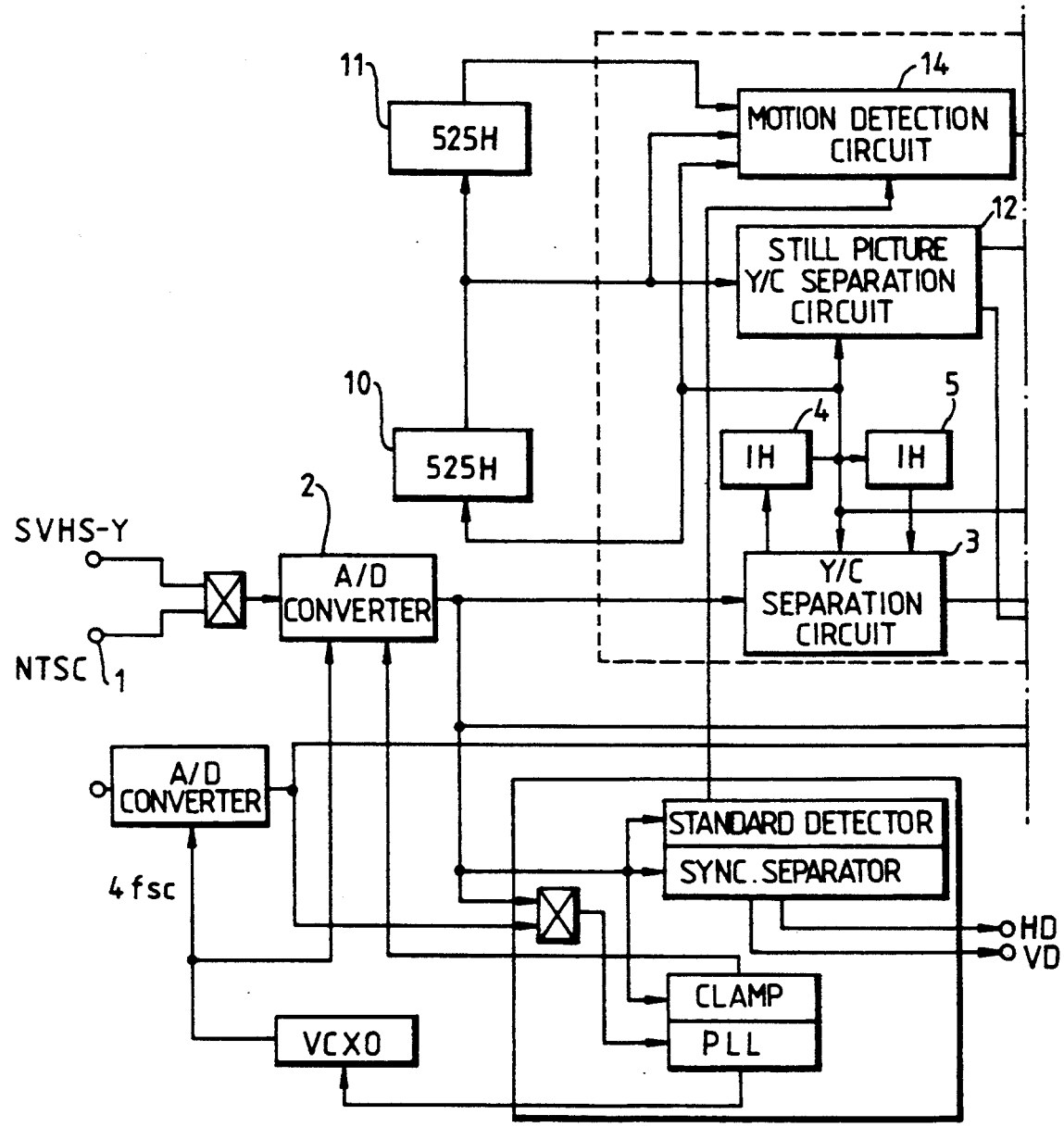
FIG. 1 is a block diagram showing a conventional video signal processing apparatus.

The present invention will be described in detail with reference to the FIGS. 2 through 8. Throughout the drawings, reference numerals or letters used in FIG. 1 will be used to designate like or equivalent elements for simplicity of explanation.

Referring now to FIGS. 2 thru 5 and FIGS. 6A to 6G, a first embodiment of the video signal processing apparatus according to the present invention will be described in detail.

Figure 2:
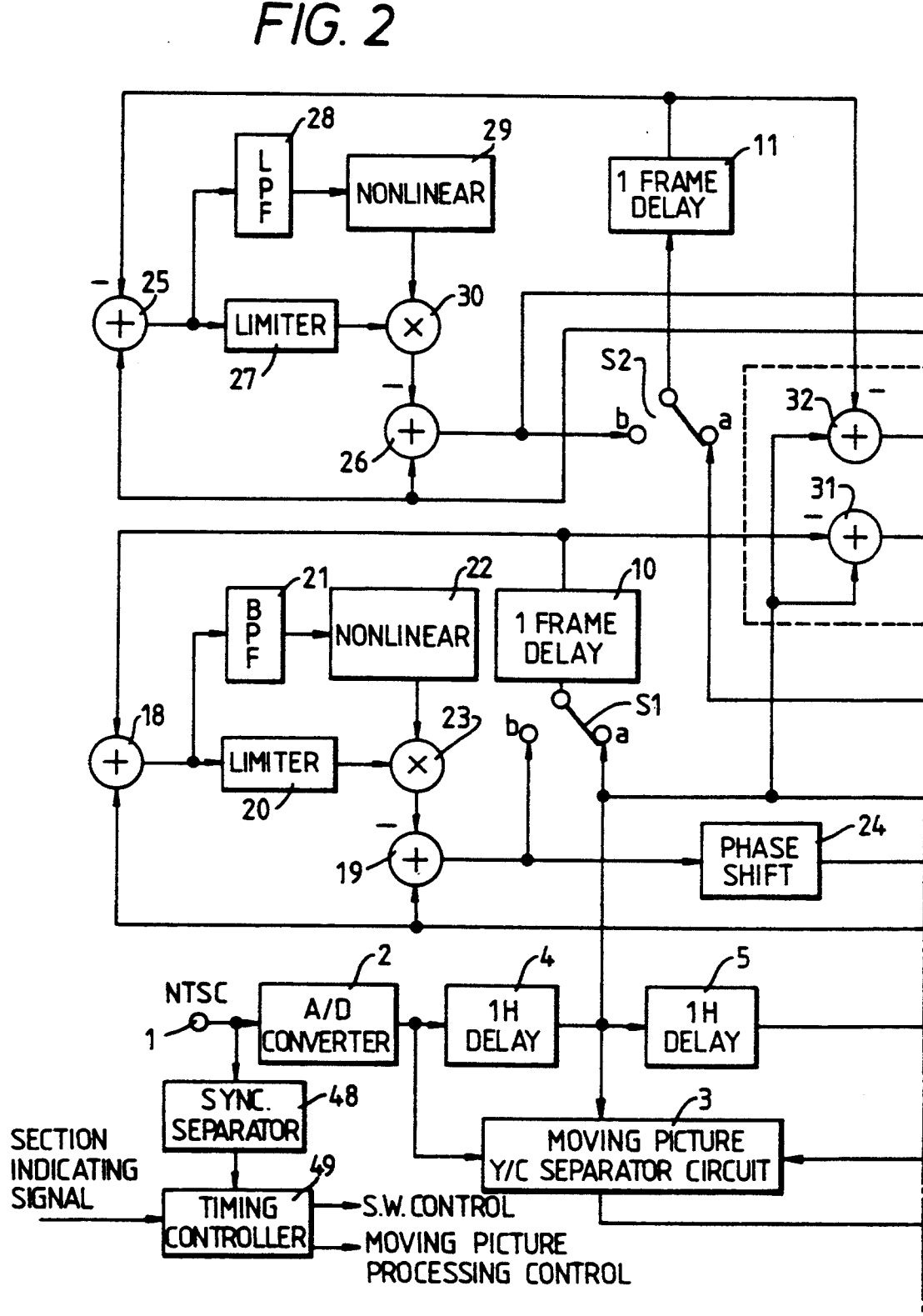
FIG. 2 is a block diagram showing an embodiment of the video signal processing apparatus according to the present invention.
Figure 2:
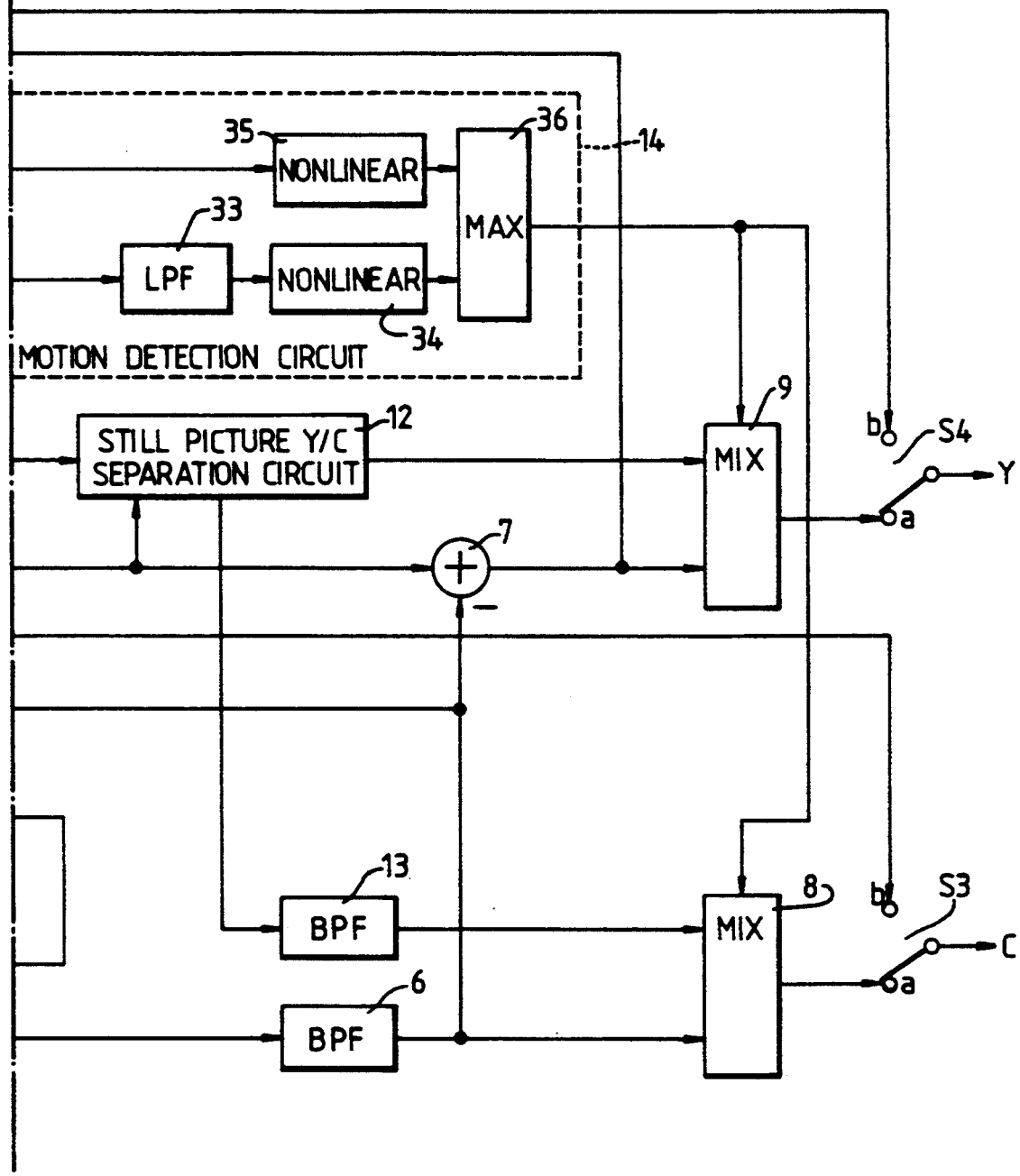

In FIG. 2, a composite video signal is applied to the A/D converter 2, which converts the input composite video signal into the digital signal and applies it to the moving picture Y/C separation circuit 3 and the 1 H delay circuit 4. The 1H delay circuit delays the input signal by by 1 H period and then provides it to the moving picture Y/C separation circuit 3 and also, to the moving picture Y/C separation circuit 3 via the 1 H delay circuit 5. The moving picture Y/C separation circuit S has a comb line filter which extracts vertical high band component (line non-correlative) from current signal input from the A/C converter 2 and 1 H and 2 H delayed signals from the 1 H delay circuits 4 and 5 using the vertical correlation of these three lines.

The extracted vertical high band component is applied the BPF 5. The BPF 6 separates the color carrier band component from the vertical high band component and provides it to the MIX 8 and the subtracter 7 as the second chrominance signal. The subtracter 7 also receives the 1 H delayed signal (the composite video signal delayed by 1 H period) from the 1 H delay circuit 4, and by separating the second chrominance signal from the 1 H delayed signal, the subtracter 7 separates the second luminance signal that is the luminance signal in case of a moving picture and provides it to the MIX 9.

The output from the 1 H delay circuit 4 is applied to the still picture Y/C separation circuit 12 and to the one-frame delay circuit 10 via the terminal a of the switch S1. The one-frame delay circuit 10 applies the 1 H delayed signal to the still picture Y/C separation circuit 12 after delaying it by the one-frame period. The still picture Y/C separation circuit 12 is supplied with the 1 H delayed signal and its one-frame delayed signal (the output from the one-frame delay circuit 10), and separates the first luminance signal that is the still picture luminance signal by adding both signals and separates the chrominance signal component (the frame non-correlative component) by subtracting both signals. The separated chrominance signal component (the frame non-correlative component) is applied to the BPF 13 and the first luminance signal is applied to the MIX 9. The BPF13 limits the band of the input chrominance signal component and provides it to the MIX 8 as the first chrominance signal that is the still picture chrominance signal.

The MIX 8 mixes the Second chrominance signal for moving picture and the first chrominance signal for still picture input from the BPFs 6 and 13, respectively, at a mixing ratio based on the motion detection signal described later, and provides the mixed signal to the terminal a of the switch S3 as the motion adaptive Y/C separated third chrominance signal. Further, in this case the larger the motion detection signal is, the larger a mixing ratio of the second chrominance signal is made by the MIX 8. Further, the MIX 9 mixes the second luminance signal for a moving picture and the first luminance signal for a still picture input from the subtracter and the still picture Y/C separation circuit 12, respectively at a mixing ratio based on the motion detection signal, and provides the mixed signal to the terminal a of the switch S4 as the motion adaptive Y/C separated third luminance signal. In this case, the larger the motion detection signal is, the larger the mixing ratio of the second luminance signal is made by the MIX 9.

The output from the one-frame delay circuit 10 is applied to the motion detection circuit 14 and also, to the one-frame delay circuit 11 via the terminal a of the switch S2. The one-frame delay circuit 11 provides the input signal to the motion detection circuit by delaying it by one-frame period. The 1 H delayed signal from the 1 H delay circuit 4 is also applied to the motion detection circuit 14. This motion detection circuit 14 detects the motion of picture patterns by the 1 H delayed signal and one-frame and two-frame delayed signals from the one-frame delay circuits 10 and 11, and provides the motion detection signal.

The motion detection circuit 14 consists of the subtracters 31 and 32, the low-pass filter (hereinafter referred to as the LPF) 33, the non-linear circuits 34 and 35, and the MAX circuit 36. The motion detection circuit 14 is designed to get the motion detection signal from the low band moving component of the luminance signal and the moving components of all frequency band signals including the chrominance signal. That is, the subtracter 31 obtains a difference in one frame by subtracting the output from the 1 H delay circuit 4 and that from the one-frame delay circuit 10. The LPF 33 provides a difference of the horizontal low band component in one frame to the non-linear circuit 34 by limiting the output from the subtracter 31. If ignoring the noise effect, a difference in one frame is found to be 0 on a complete still picture and a finite value on a moving picture. Using the fact that the larger the motion is, the larger a difference in one frame will become, the non-linear circuit 34 converts the differential signal of the horizontal low band component of the luminance signal from the LPF 33 in one frame into the motion signal K and provides it to the MAX circuit 36. Further, the motion signal K is equal to 0 on a complete still picture and to 1 on a complete moving picture ($0 \leq K \leq 1$).

The subtracter 32 is supplied with the 1 H delayed signal and its two-frame delayed signal from the 1 H delay circuit 4 and the one-frame delay circuit 11, respectively, and obtaining a difference between two frames of all the frequency band components, including the chrominance signal performing the differential operation of both input signals and providing it to the non-linear circuit 35. The phase of color subcarrier is reversed for every frame and a difference between two frames is 0 on a complete still picture and a finite value on a moving picture. Using the fact that the larger the motion is, the larger a difference between two frames will become, the non-linear circuit 35 converts the difference signal between two frames from the subtracter 32 into the motion signal.

The motion signals K from the non-linear circuits 34 and 35 are applied to the MAX circuit 36. This MAX circuit 36 consists of a comparison circuit to compare sizes of two input motion signals and a selection circuit to select either one of two inputs, and outputs either the luminance signal low band motion signal K or the all frequency band motion signal K, whichever is larger, as the motion detection signal. The output from the MAX circuit 36 is applied to the MIXs 8 and 9.

Generally, when the motion was erroneously judged to be small or the detection of motion was omitted, the frame is disturbed more severely than when the motion was erroneously judged to be large. For instance, even if a still picture was erroneously detected to be a moving picture in the motion adaptive Y/C separation, the Y/C separation property using the line correlation is maintained and deteriorating of the Y/C separation property is relatively less.

However, if a moving picture was erroneously judged to be a still picture as the detection of the motion was failed, the large portion of the frame is severely disturbed by adverse effects of residual image, etc. For this reason, the motion detection circuit 14 selects a large level motion signal by the MAX circuit 36. Further, the motion detection circuit 14 changes the motion detection property by the non-linear circuits 34 and 35.

Figure 3:
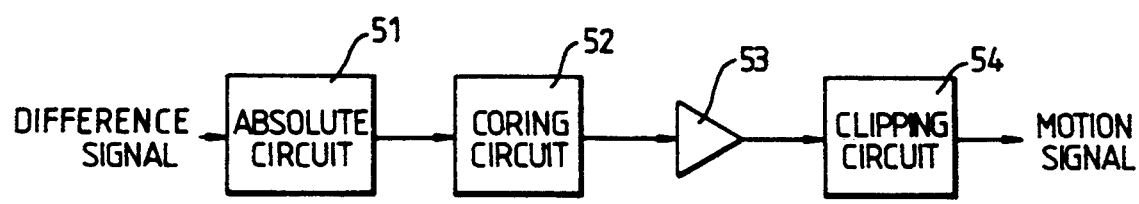
FIG. 3 is a block diagram showing the detail construction of the non-linear circuits 34 and 35 in FIG. 2.
Figure 4:
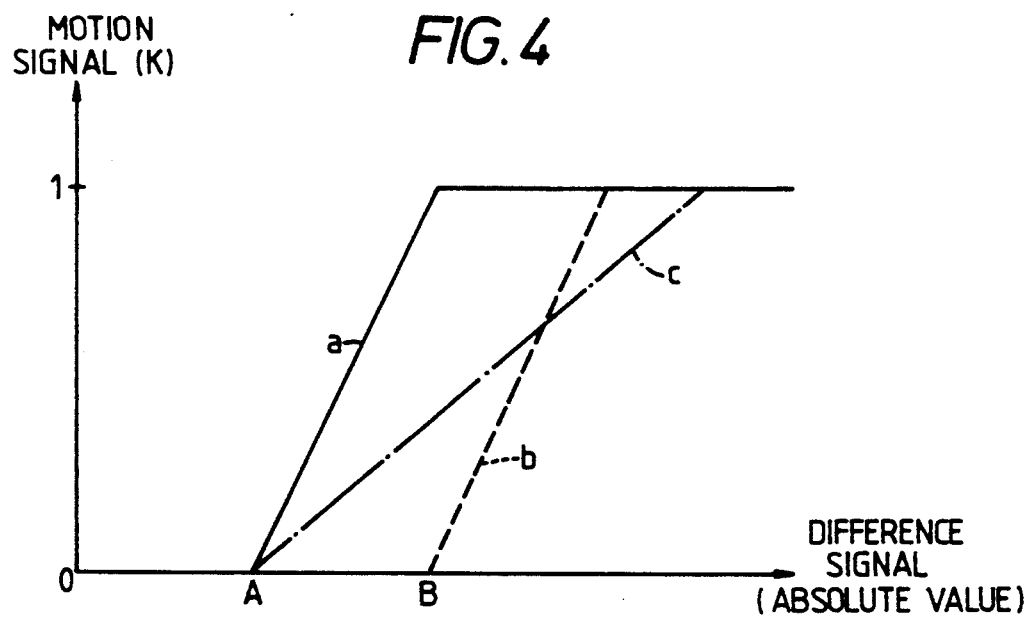
FIG. 4 is a graph for explaining a coring property.

FIG. 3 is a block diagram showing a detail construction of the non-linear circuits 34 and 35 shown in FIG. 2. FIG. 4 is a graph showing the input/output properties of the non-linear circuit with differences shown on the axis of abscissas and the motion signal K on the axis of ordinates.

A difference in one frame or between two frames is applied to the absolute value circuit 51. The absolute value circuit 51 obtains an absolute value of the input difference and provides it to the coring circuit 52. The coring circuit 52 applies an offset shown by A, B, etc. in FIG. 4 to the output from the absolute value circuit 51 by coring it at the fixed coring amounts and providing it to the coefficient circuit 53. The coefficient circuit 53 multiplies the output from the coring circuit 52 by a fixed coefficient and provides the result to the clip circuit 54. The property tilts shown by the solid line a, the broken line b or the one-dot chain line c in FIG. 4 are applied by the coefficient circuit 53. The clip circuit 54 clips a value above "1" and outputs as the motion signal K.

When, the larger an offset value in the coring circuit is set, the easier it becomes to determine a picture to be a still picture when detecting for motion, and the smaller the property tilts are set by making the coefficient of the coefficient circuit 53 smaller, the easier it becomes to determine a picture to be a still picture.

The second chrominance signal that is the chrominance signal of a moving picture from the BPF 6 is applied to the adder 18 and the subtracter 19, while the second luminance signal that is the luminance signal of a moving picture from the subtracter 7 is applied to the subtracters 25 and 26. The cyclic frame noise reduction circuit for the second chrominance signal is composed of the one-frame delay circuit 10, the adder 18, the subtracter 19, the limiter 20, the BPF 21, the non-linear circuit 22 and the multiplier 23. Similarly, the cyclic frame noise reduction circuit for the second luminance signal is composed of the one-frame delay circuit 11, the subtracters 25 and 26, the limiter 27, the LPF 28, the non-linear circuit 29 and the multiplier 30.

The one-frame delayed signal from the one-frame delay circuit 10 is also applied to the adder 18. The phase of the color carrier is reversed for every frame and the adder 18 obtains the frame non-correlative component of the chrominance signal by obtaining the sum of the signals before and after one frame. This frame non-correlative component of the chrominance signal is applied to the limiter 20 and the BPF 21. The limiter 20 extracts a small amplitude component as the frame non-correlative noise by suppressing a large amplitude component of the non-correlative component and provides to the multiplier 23.

The BPF 21 and the non-linear circuit 22 construct the motion detection circuit that provides the frame noise reduction process for the second chrominance signal to a motion adaptable type. That is, the BPF 21 limits the band of the non-correlative component so that the noise component outside the chrominance signal band does not adversely affect the motion detection, and then provides the chrominance signal to the non-linear circuit 22. The non-linear circuit 22 is composed of the clip circuit 54 (see FIG. 3) of the non-linear circuits 34 and 35 with a subtracter added at the rear stage of the clip circuit 54, and by this subtracter, the motion signal K ($0 \leq K \leq 1$) from the clip circuit 54 is subtracted from 1 and the resulted value is converted into the noise reduction coefficient of ($1-K$) and is applied to the multiplier 23. The multiplier 23 multiplies the frame non-correlative noise from the limiter 20 by the noise reduction coefficient and provides to the subtracter 19. This subtracter 19, by subtracting the frame non-correlative noise of the output of the multiplier 23 from the second chrominance signal, obtains the fourth chrominance signal with noise reduced.

The larger the motion, the less the noise reduction coefficient becomes and the noise reduction effect in the subtracter 23 is lowered. Additionally, the adverse effect of residual image, etc. is also reduced. The fourth chrominance signal, after subjected to this motion adaptive noise reduction, is fed back to the one-frame delay circuit 10 via the terminal b of the switch S1 and at the same time, is also applied to the phase shifting circuit 24.

The second luminance signal is directly applied to the subtracter 25 that constructs the frame noise reduction circuit for the second luminance signal, and also is applied to the subtacter 25 via the terminal b of the switch S2 and the one-frame delay circuit 11 after being delayed by one-frame. The subtracter 25 obtains the frame non-correlative component of the luminance signal by obtaining a difference between the second luminance signals before and after one frame. This frame non-correlative component of the luminanee signal is applied to the limiter 27 and the LPF 28.

The limiter 27 suppresses the large amplitude component of the input non-correlative component, extracts the small amplitude component as the frame non-correlative noise and provides it to the multiplier 30. The LPF 28 and the non-linear circuit 29 construct the motion detection circuit likewise the BPF 21 and the non-linear circuit 22. That is, the LPF 28 provides the non-correlative component to the non-linear circuit 29 by limiting its band so that the noise component outside the luminance signal band does not adversely affect the motion detection. The non-linear circuit 29 is of the same construction as the non-linear circuit 22, and subtracting the motion signal K ($0 \leq K \leq 1$) from the clip circuit 54 from 1, converts the result into the noise reduction coefficient of ($1-K$) which is provided to the multiplier 30.

The multiplier 30, by multiplying the frame non-correlative noise from the limiter 27 by the noise reduction coefficient, obtains the motion corrected noise component and provides it to the subtracter 26. This subtracter 26 subtracts the frame non-correlative noise output from the multiplier 30 from the second luminance signal and obtains the fourth luminance signal with noise reduced.

Since the larger the motion, the smaller the noise reduction coefficient becomes, the noise reduction effect in the subtracter 26 is reduced. Yet deficits such as residual image, etc. also become small. Thus, the motion adaptive frame noise reduction process is carried out by the one-frame delay circuit 11, the subtracters 25 and 26, the limiter 27, the LPF 28, the non-linear circuit 29 and the multiplier 30, and the fourth luminance signal with noise reduced is fed back to the one-frame delay circuit 11 via the terminal b of the switch S2 and is also applied to the terminal b of the switch S4.

In this embodiment, the phase shifting circuit 24 adjusts the phase of the color subcarrier of the input fourth chrominance signal so as to agree with the phase of the color subcarrier of the third chrominance signal, and then provides the signal as the fifth chrominance signal to the terminal b of the switch S3.

Figure 5:
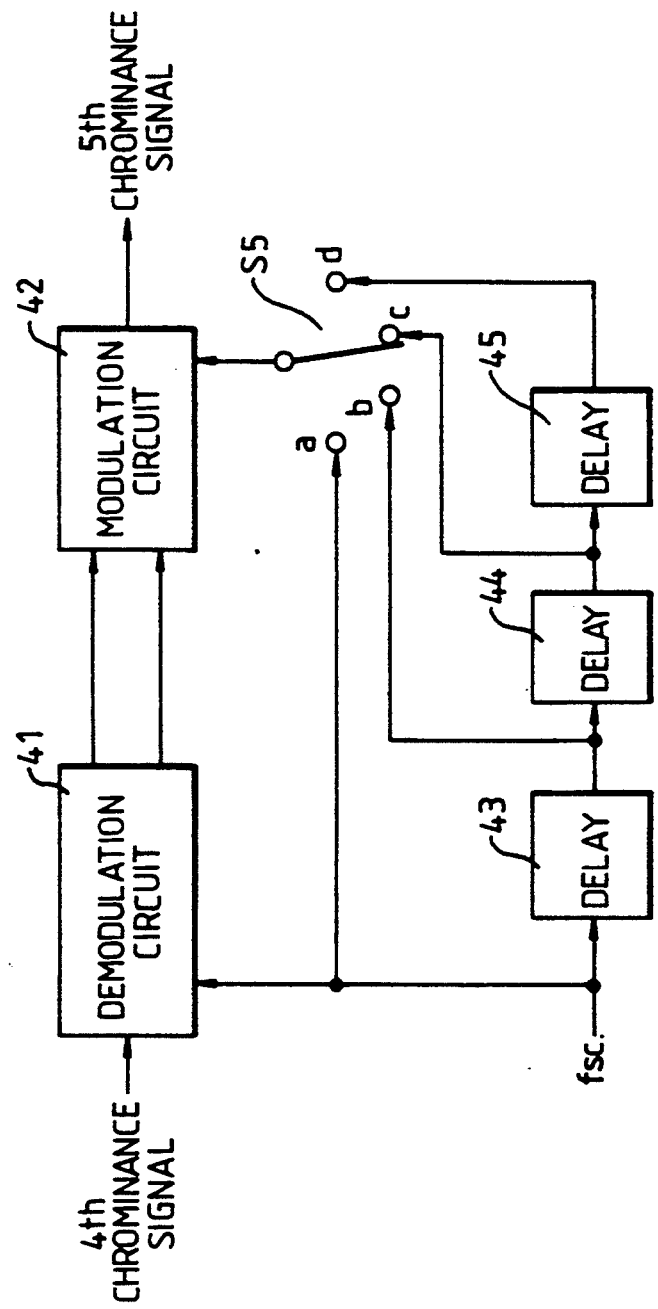
FIG. 5 is a block diagram showing the detail construction of the phase shifting circuit 24 in FIG. 2.
Figure 6:
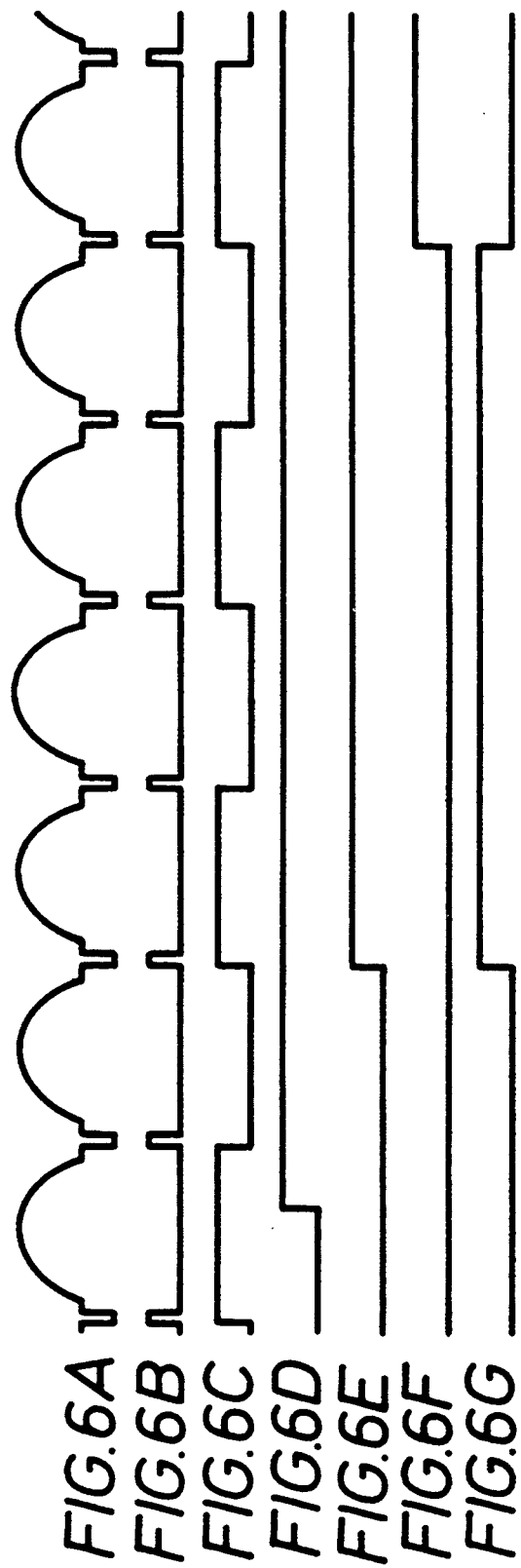
FIGS. 6A thru 6G are a timing chart for explaining the operations of the embodiment of according to the present invention.

FIG. 5 is a block diagram showing a detail construction of the phase shifting circuit shown in FIG. 2.

The fourth chrominance signal from the subtracter 19 is applied to the demodulator 41. The demodulator 41 demodulates the fourth chrominance signal to two orthogonal color difference signals by performing synchronous demodulation using the signal fsc (the frequency of fsc is the same as the color subcarrier frequency (3.579545 MHz) synchronous with the color subcarrier of the fourth chrominance signal. The demodulated two color difference signals are applied to the modulation circuit 42. The signal fsc is applied to the terminal a of the switch S5 and at the same time, is also applied to the switch S5 via the cascade connected delay circuits 43, 44 and 45. These delay circuits 43, 44 and 45 are the registers using the system clock and applies the input signal to the terminals b, c and d of the switch S5 after delaying the signal by the system clock period.

For instance, taking easiness of process and simplicity of the circuit into account, 4 fsc clocks of which phase is synchronous with the color subcarrier is used as the system clock. In this case, the delay circuits 43, 44 and 45 delay the input signal by (¼)fsc and the signal fsc having a different phase by 90 degree is supplied to each of the terminals a through d of the switch S5.

The switch S5 selects one of the terminals a through d to offset the phase difference between the third and fourth chrominance signals and provides the signal having the specified phase synchronous with the color subcarrier to the modulation circuit 42. The phase difference between the color subcarriers of the third and fourth chrominance signals is produced by a difference between the signal route generate the third chrominance signal and that to generate the fourth chrominance signal. Therefore, if the signal delay time of each signal route is known at the time of circuit designing, the terminal to be selected by the switch S5 can also be known.

The modulation circuit 42 modulates two color difference signals from the demodulation circuit 41 using the color subcarrier sync signal from the switch S5 and provides the modulated signal as the fifth chrominance signal. The modulation circuit 42 modulates color difference signals using a signal having the same phase as the color subcarrier of the third chrominance signal and therefore, the phase of color subcarrier of the third chrominance signal agrees with that of the fifth chrominance signal. Thus, the phase shifting circuit 24 brings the phase of the fourth chrominance signal to agree with that of the third chrominance signal during the demodulation and modulation processes and provides the phase agreed signal to the terminal b of the switch S3 as the fifth chrominance signal.

The composite video signal that is input through the input terminal 1 is also applied to the sync separation circuit 48. The sync separation circuit 48 extracts the vertical sync signal from the input composite video signal and applies it to the timing control circuit 49. The timing control circuit 49, taking the delay times of the one-frame delay circuits 10 and 11 into account, produces a one-frame signal by dividing the vertical sync signal into two and controls the selection timing of the switches S1 through S4 using this one-frame signal as a unit. That is, the selection indicating signal is also applied to the timing control circuit 49. The timing control circuit 49 latches this selection indicating signal at the leading edge of the one-frame signal and applies it to the switches S1 through S4 as the selection control signal. The switches S1 through S4 select the terminal a at the high level (hereinafter referred to as "H") of the selection control signal and the terminal b at the low level (hereinafter referred to as "L"). Thus, the switches S1 through S4 are operated so as to control each frame within the vertical blanking interval.

Further, a user can change over the selection indicating signal according to the S/N of the input composite video signal or when adapting it for receiving TV broadcasting, it may be changed over automatically according to the electric field strength of TV broadcasting signals applied to the tuner.

By the way, when the switches S1 through S4 select the terminal a or b, the signal passing through the one-frame delay circuits 10 and 11 differs. That is, when the switches S1 through S4 select the terminal a, composite video signal is supplied to the one-frame delay circuits 10 and 11 and when the terminal b is selected, chrominance signal is supplied to the one-frame delay circuit 10 and luminance signal to the one-frame delay circuit 11. Therefore, when the switches S1 through S4 select the terminals a and b, for the two-frame period until signals to be supplied to the one-frame delay circuits 10 and 11 after the selection, any process using the outputs from the one-frame delay circuits 10 and 11 is suspended. This suspension of process is effected by the moving picture process control signal from the timing control circuit 49.

The timing control circuit 49 delays the selection control signal by a two-frame period, and by obtaining the exclusive OR of this two-frame delayed signal and the selection control signal, generates the moving picture process control signal that becomes "H" during the two-frame period after the selection process of the switches S1 through S4. If the switches S1 through S4 are changed from the terminal b to the terminal a, the second chrominance signal and the second luminance signal are only applied to the MIXs 8 and 9, respectively during the period when the moving picture control signal is at "H" and the second chrominance signal and the second luminance signal are directly output without having the subtracters 19 and 26 perform the noise reduction operation. Further, if the switches S1 through S4 are changed from the terminal a to the terminal b, the second chrominance signal and the second luminance signal are directly output, respectively, without having the subtracters 19 and 26 perform the noise reduction operation.

When, for instance, an OR gate that is not shown is added to the output end of the MAX circuit 36, the output from the MAX circuit 36 and the moving picture process control signal are applied to the OR gate, and the output from the OR gate is applied to the MIXs 8 and 9 as the motion detection signal, it is possible to provide the second chrominance signal and the second luminance signal from the MIXs 8 and 9, respectively. Further, when an AND gets that is not shown is added to each of the output ends of the non-linear circuits 22 and 29, respectively, the outputs from the non-linear circuits 22 and 29 and the reversed signal of the moving picture process control signal are applied to each AND gate, and the output of each AND gate is applied to the multipliers 23 and 30, respectively as the noise reduction coefficient, it becomes possible to provide the second chrominance signal and the second luminance signal directly from the subtracters 19 and 26 without removing noise.

Next, the operation of the video signal processing apparatus according to this embodiment composed as described above is explained referring to the timing chart shown in FIGS. 6A through 6G. FIG. 6A shows the input composite video signal, FIG. 6B shows the vertical sync signal, FIG. 6C shows the one-frame signal generated in the timing control circuit 49, FIG. 6D shows the selection indicating signal, FIG. 6E shows the selection control signal, FIG. 6F shows the two-frame delayed signal of the selection control signal, and FIG. 6G shows the moving picture process control signal.

In this embodiment it is decided whether the frame operations in the moving picture and still picture Y/C separation processes are to be processed in parallel or in series by changing over the switches S1 through S4 when the S/N of the input composite video signal is high or low. The selection timing is determined by the selection control signal from the timing control circuit 49. That is, the composite video signal (see FIG. 6A) input through the input terminal 1 is applied to the sync separation circuit 48 for separating and extracting the vertical sync signal (see FIG. 6B). FIG. 2 shows the switches S1 through S4 that are shifted from the state where the terminal b has been selected to the state to select the terminal a. The timing control circuit 49 generates the frame signal shown in FIG. 6C from the vertical sync signal.

Here, for instance, when assuming that the S/N becomes satisfactory and the selection indicating signal shown in FIG. 6D changes from "L" to "H", the timing control circuit 49 latches this selection indicating signal at the leading edge of the frame signal and provides it to the switches S1 through S4 as the "H" selection control signal shown in FIG. 6E. As a result, the switches S1 through S4 are changed from the terminal b to the terminal a. That is, the connecting state is changed during the vertical retrace period containing no chrominance signal and therefore, no color disturbance is presented on the screen.

Further, the timing control circuit 49 generates a signal (see FIG. 6F) by delaying the selection control signal by the two-frame period and by obtaining the exclusive OR of this signal and the selection control signal, generates the moving picture process control signal (see FIG. 6G), This moving picture process control signal becomes "H" only for the two-frame period because of the change in the selection control signal and acts on the motion detection signal from the MAX circuit 36 and the outputs from the non-linear circuits 22 and 29. For instance, the logical OR of the motion detection signal from the MAX circuit 36 and the moving picture process control signal is obtained and applied to the MIXs 8 and 9 as a new motion detection signal and the AND of the noise reduction coefficients from the non-linear circuits 22 and 29 and the reversed signal of the moving picture process control signal is obtained and applied to the multipliers 23 and 30, respectively, as a new noise reduction coefficient.

Then, during the two-frame period after the selection operations of the switches S1 through S4, the MIXs 8 and 9 provide the second chrominance signal and the second luminance signal, the outputs from the multipliers 23 and 30 become zero, and the subtracters 19 and 26 provide the second chrominance signal and the second luminanee signal without removing noise. Therefore, during the two-frame period after the selection operations of the switches S1 through S4, the process using the outputs from the one-frame delay circuits 10 and 11 will not be carried out.

Next, the operation when the switches S1 through S4 are in the connected state is explained.

Now, the S/N of the input composite video signal is assumed to be relatively satisfactory. In this case, the switches S1 through S4 select the terminal a by the selection control signal, the moving picture Y/C separation circuit 3 and the still picture Y/C separation circuit 12 are set in the parallel connected state.

The composite video signal input through the input terminal 1 is applied to the moving picture Y/C separation circuit 3. The 1 H and 2 H delayed signals from the 1 H delay circuits 4 and 5 are also applied to the moving picture Y/C separation circuit 3 and using the vertical correlation of these three line signals, the vertical high band component (the line non-correlative component) is extracted. The BPF 6 obtains the second chrominance signal for the moving picture by separating the color carrier band component from the extracted vertical high band component and provides it to the a MIX 8 and the subtracter 7. The subtracter 7 subtracts the second chrominance signal from the 1 H delayed signal to obtain the second luminance signal for the moving picture and provides it to the MIX 9.

The luminance and chrominance signals for the still picture are obtained by the still picture Y/C separation circuit 12. That is, the output from the 1 H delay circuit 4 is applied to the still picture Y/C separation circuit 12 directly and also, via the terminal a of the switch S1 and the one-frame delay circuit. The still picture Y/C separation circuit 12 is supplied with the 1 H delayed signal and its one-frame delayed signal, and by adding both signals, obtains the first luminance signal for still picture and provides it to the MIX. By subtracting both signals, the chrominance signal component is obtained (the frame non-correlative component). This chrominance signal component is applied to the BPF 13, which by limiting the band, provides the first chrominance signal for still picture to the MIX 8. The mixing ratio of these MIXs 8 and 9 is controlled by the motion detection signal from the motion detection circuit 14.

The motion detection circuit 14 obtains a difference of the video signals before and after the one-frame period by the subtracter 31, by passing it through the LPF 33, obtains a difference in the one-frame period of the horizontal low band component and provides it to the non-linear circuit 34. Further, the subtracter 32 obtains a difference between two frames of full frequency band including the chrominance signal and provides it to the non-linear circuit 35. The non-linear circuits 34 and 35 have the properties as shown in FIG. 4. As shown in FIG. 4, a fixed offset is applied by the coring circuit 52 (see FIG. 3) and until such a time when the difference exceeds this value, the motion signal K (=0) showing a complete still picture is output from the non-linear circuits 34 and 35. If the motion of the picture pattern becomes large and a difference applied to the non-linear circuit 34 and 35 becomes large, the motion signal K becomes large as shown by the property a, b and c. In case of complete moving picture, the motion signals K from the non-linear circuits 34 and 35 becomes 1.

That is, the motion detection property is adjustable by controlling an offset value of the coring circuit 52 and a coefficient of the coefficient circuit 53. For instance, when considering the possibility for erroneously detecting noise as motion, it is better to set the motion detection property so that a motion is judged to be a still picture. In other words, set an offset at a large value and a coefficient of the coefficient circuit 53 at a small value. Then, the first and second motion detection signals from the motion detection circuit 14 tend to show that the motion is small and, the mixing ratio of the first luminance signal in the MIX 9 becomes high and the mixing ratio of the first chrominance signal in the MIX 8 becomes high. As a result, the effect of the Y/C separation using the frame correlation increases and the cross color disturbance improving effect can be promoted.

Thus, the third chrominance signal and the third luminance signal are output from the MIXs 8 and 9, respectively, via the terminal a of the switches S3 and S4.

Next, it is assumed that the S/N of the input composite video signal is relatively deteriorated. In this case, the second luminance and chrominance signals are separated from the moving picture Y/C and are processed by the frame noise reduction operation and then output therefrom. The switches S1 through S4 select the terminal b according to the selection control signal from the timing control circuit 49. As the switches S3 and S4 select the terminal b, the Y/C separation operation by the still picture Y/C separation circuit 12 is not carried out.

The output from the moving picture Y/C separation circuit 3 is applied to the BPF 6 and the subtracter 7. From the BPF 6, the second chrominance signal that is the chrominance signal for moving picture is applied to the subtractor 7. Thus the subtracter 7 provides the second luminance signal that is the luminance signal for moving picture. This second chrominance signal is applied to the adder 18 and the subtracter 19 which comprise the cyclic frame noise reduction circuit and the second luminance signal is applied to the subtracters 25 and 26 which comprise the cyclic frame noise reduction circuit.

The chrominance signal delayed by one frame by the one-frame delay circuit 10 is also applied to the adder 18. By adding these two inputs, the adder 18 obtains non-correlative component of the chrominance signal and provides it to the limiter 20 and the BPF 21. The limiter 20 judges small amplitude component out of the non-correlative component to be noise and provides a component in the specified amplitude or below to the multiplier 23. The motion component is detected by the BPF 21 and the non-linear circuit 22 and converting this motion component into a noise reduction coefficient by subtracting from 1, provides the coefficient to the multiplier 23.

The larger the motion, the smaller value a noise reduction coefficient becomes. By multiplying the noise component from the limiter 20 by a noise reduction coefficient, the multiplier 23 reduces the motion component contained in the output from the limiter 20 and provides it to the subtracter 19, The subtracter 19 subtracts the output of the multiplier 23 from the second chrominance signal for reducing noise and provides the fourth chrominance signal with noise reduced to the terminal b of the switch S1 and the phase shifting circuit 24. The switch S1 has selected the terminal b and thus, a cyclic noise reduction circuit is composed.

The second luminance signal is applied to the subtracters 25 and 26. The subtracter 25 carries out the subtraction of the output from the one-frame delay circuit and the second luminance signal and provides the frame non-correlative component of the luminance signal to the limiter 27 and the LPF 28. The limiter 28 judges small amplitude components out of the frame non-correlative component to be noise and provides components in the specified amplitude or below to the multiplier 30. The LPF 28 and the non-linear circuit 29 obtains the motion component of the frame non-correlative component and by subtracting it from 1, obtains a noise reduction coefficient. The multiplier 23 provides the noise component with the motion component reduced by multiplying the noise component and the noise reduction coefficient to the subtracter 19. The subtracter 19, subtracting the output from the multiplier 23 from the second luminance signal, obtains the luminance signal with the noise component reduced and provides it as the fourth luminance signal to the terminal b of the switches S2 and S4. The fourth luminance signal applied to the switch S2 is supplied to the subtracter 25 via the one-frame delay circuit 11, constructing a cyclic noise reduction circuit. The fourth luminance signal is output from the switch S4 as the luminance signal.

In the embodiment the phase shifting circuit 24 shifts the phase of the fourth chrominance signal based on a difference in signal delay times between the signal route when the still picture Y/C separation is carried out and the signal route when a noise reduction circuit is composed, that is, the phase difference between the second and fourth chrominance signals. The phase shifting circuit 24 obtains two orthogonal color difference signals by demodulating the fourth chrominance signal with the signal fsc, whose frequency is synchronized with the color subcarrier of the fourth chrominance signal. The delay circuits 43, 44 and 45 delay the signal for the system clock period. For instance, if the system clock is set at a frequency of 4 fsc, the signal of frequency fsc each of which phase differs by 90 degree, is applied to the terminals a through d of the switch S5. Since the system clock is 4 fsc, the phase of the color subcarrier of the third chrominance signal is the same as one of the four phase state supplied to the switch S5.

The switch S5 selects one of the terminals a through d based on a difference of the signal delay time when the terminal a or b is selected by the switches S1 through S4. The modulation circuit 42 modulates the color difference signal from the demodulation circuit 41 by the signal from the switch S5 and provides the chrominance signal having the same phase as the third chrominance signal. The fifth chrominance signal is output as a chrominance signal via the terminal b of the switch S3.

As described above, in this embodiment, if the S/N of input composite video signal is relatively satisfactory, the switches S1 through S4 select the terminal a and the moving picture Y/C separation process and the still picture Y/C separation process are carried out in parallel with each other (the motion adaptive Y/C separation), and the sufficient Y/C separation property is provided, while if the S/N of input composite video signal is relatively deteriorated, the switches S1 through S4 select the terminal b according to the selection indicating signal, the cyclic frame noise reduction process using the one-frame delay circuits 10 and 11 is carried out after the moving picture Y/C separation process, and the S/N is improved without increasing memory capacity. Furthermore, as the selection operations of the switches S1 through S4 is controlled by a frame signal and the connected state is changed during the vertical retrace period, no color shading will be presented on the screen.

Further, if the switches S1 through S4 selected the terminal b, only the moving picture Y/C separation process using the line correlation is carried out, but cross color and dot disturbance that are not removable by the moving picture Y/C separation can be reduced as noises by the frame noise reduction operation and furthermore, deterioration of the oblique resolution by the moving picture Y/C separation will scarcely become a problem as it is caused when the S/N of input signal is low.

In this embodiment, as the phase of the color subcarrier of the fourth chrominance signal corresponds with that of the color subcarrier of the third chrominance signal by the phase shifting circuit 24, no such troubles as color shading, color vanishing, etc. will be presented on the screen.

Figure 7:
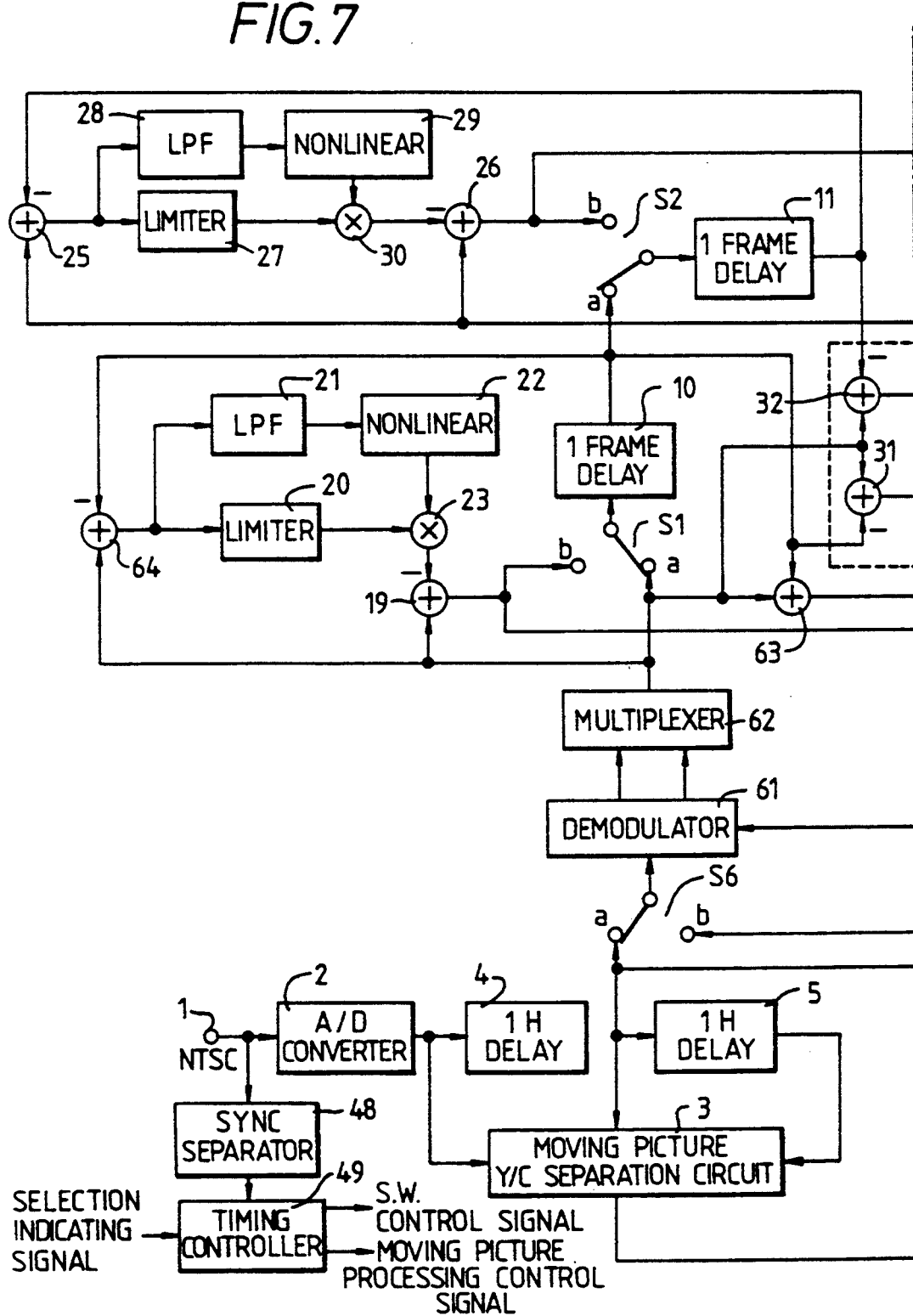
FIG. 7 is a block diagram showing another embodiment according to the present invention.
Figure 7:
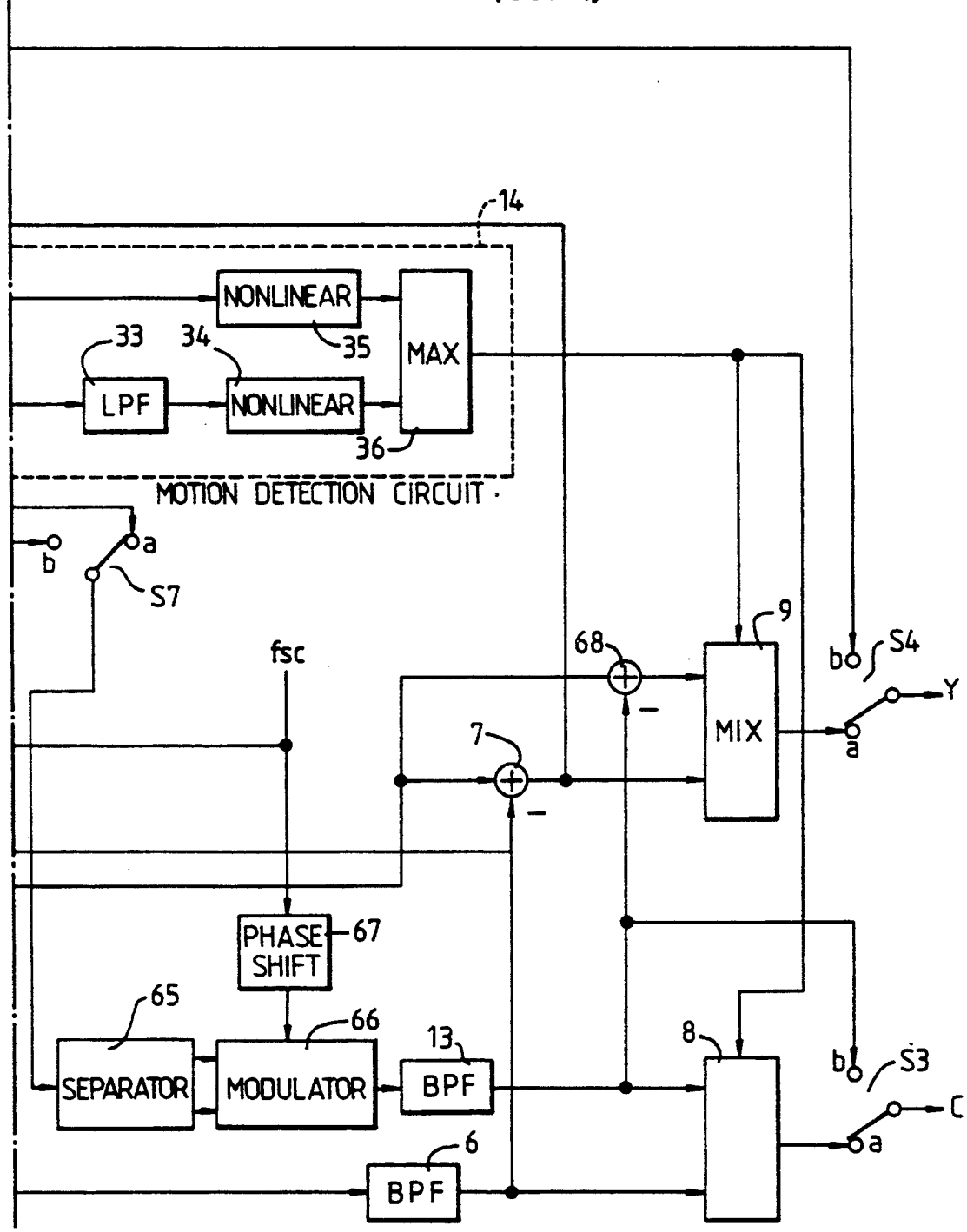

FIG. 7 is a block diagram showing another embodiment of the present invention. In FIG. 7, the same components as in FIG. 2 are assigned with the same marks and the explanations are omitted. In this embodiment, the processing method of signals in the chrominance signal band in the frame Y/C separation process and the frame noise reduction process differs from the embodiment shown in FIG. 2 and the frame operation processes are carried out after demodulating signals in the chrominance signal band.

The 1 H delayed signal from the 1 H delay circuit 4 is applied to the demodulation circuit 61 via the terminal a of the switch S6. The demodulation circuit 61 demodulates the 1 H delayed signal by two orthogonal color difference axes of the signal fsc synchronized with the color subcarrier and provides two color difference signals with luminance signal frequency multiplexed to the multiplexing circuit 62. The multiplexing circuit 62 converts the input two color difference signals to one channel signal by time-division multiplexing and provides to the terminal a of the switch S1, the adder 63, the motion detection circuit 14 and the subtracters 19 and 64. Further, the subtracter 64 is provided in place of the adder 18 in the chrominance signal noise reduction circuit shown in FIG. 2. The one-frame delayed signal from the one-frame delay circuit 10 is also applied to the adder 63.

In the demodulation process by the demodulation circuit 61, the color difference signal has one-frame correlation and the phase of luminance signal is reversed for every frame. The adder 63 adds the output of the multiplexing circuit 62 and its one-frame delayed signal, reduces the luminance signal, and separates the color difference signal for still picture in the time-division multiplexed state. The output from the adder 63 is applied to the separation circuit 65 via the terminal a of the switch S7. The separation circuit 65 separates two color difference signals in the time-division multiplexed state and applies them to the modulation circuit 66.

The modulation circuit 66 is supplied with the signal synchronized with the color subcarrier from the phase shifting circuit 67 described later and modulating the output from the separation circuit 65 by two orthogonal color difference axes of the signal synchronized with the color subcarrier, restore it to the carrier chrominance signal. The carrier chrominance signal is applied to the BPF 13 which, by limiting the band of this carrier chrominance signal, provides the first chrominance signal that is the chrominance signal for still picture to the MIX 8 and the subtracter 68. The subtracter 68, by subtracting the first chrominance signal from the output of the 1 H delay circuit 4, separates the first luminance signal that is the luminance signal for still picture and provides it to the MIX 9.

Figure 8:
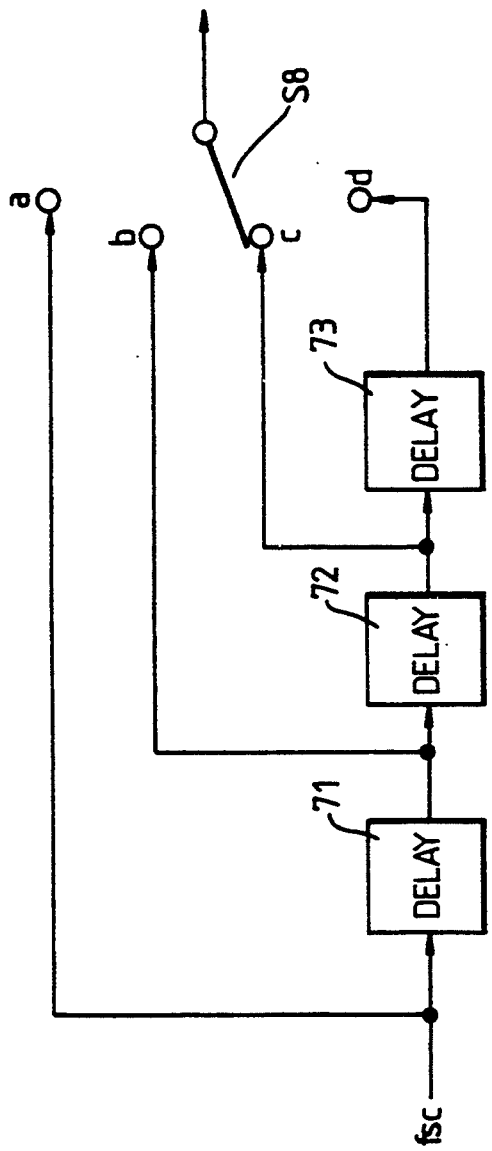
FIG. 8 is a block diagram showing the detail construction of the phase shifting circuit 67 in FIG. 7.

FIG. 8 is a block diagram showing a detail construction of the phase shifting circuit 67 shown in FIG. 7.

The signal fsc synchronized with the color subcarrier is applied to the terminal a of the switch S8 and the cascade connected delay circuits 71, 72 and 73. These delay circuits 71, 72 and 73 are the registers using the 4 fsc system clock and provide the input signal by delaying by ($\frac{1}{4}$)fsc. The outputs from the delay circuits 71, 72 and 73 are applied to the terminals b through d, respectively, of the switch S8. That is, signals synchronized with the color subcarrier and having phases differing each other by 90 degrees are applied to the terminals a through d of the switch S8. The switch 8 selects a specified terminal so as to bring the phase of the first chrominance signal for still picture in agreement with that of the second chrominance signal for moving picture.

Further, the switches S1 through S4, S6 and S7 are simultaneously operated for selecting the terminals a to carry out the motion adaptive Y/C separation process and the terminals b for other cases.

Next, the operation of the embodiment in such structure as described above is explained.

If the S/N of input composite video signal is relatively satisfactory, the switches S1 through S4, S6 and S7 select the terminal a according to the selection control signal from the timing control circuit 49. In this embodiment, the still picture Y/C separation process (the frame Y/C separation process) in the motion adaptive Y/C separation, that is, the separation of the first luminance signal and the first chrominance signal is carried out by the modulation 66 and the demodulation circuit 61, the multiple separation circuits 62 and 65, the one-frame delay circuits 10 and the adder 63.

The 1 H delayed signal from the 1 H delay circuit 4 is demodulated by two orthogonal color difference axes of the signal fsc synchronized with the color subcarrier in the demodulation circuit 61 and applied to the multiplexing circuit 62, The multiplexing circuit 62 time-division multiplexes the two input color difference signals and applies them to the one-frame delay circuit 10 via the terminal a of the switch S1 and also to the adder 63. The one-frame delayed signal is also applied to the adder 63 from the one-frame delay circuit 10. The phase of the luminance signal applied to the adder 63 is reversed for every frame. The adder 63, by adding two inputs, obtains the color difference signal for still picture in the time-division multiplex state with the reduced luminance signal and provides it to the separation circuit 65 via the switch S7.

The separation circuit 65 separates the output from the adder 63 into two color difference axes signals and applies to the modulation circuit 66. The modulation circuit 66 modulates the color difference signal by a signal from the phase shifting circuit 67 and restores it to a carrier chrominance signal. If the system clock is 4 fsc, the phase shifting circuit 67 is able to provide signals synchronized with the color subcarrier and having 4 phases which are different from each other by 90 degrees. The color subcarrier of the second chrominance signal takes one of four phases which are different by 90 degree each other. The switch S8 selects the specified terminal based on the circuit design and a signal in the same phase as that of the color subcarrier of the second chrominance signal is output from the phase shifting circuit 47 to the modulation circuit 66, Therefore, the phase of the carrier chrominance signal from the modulation circuit 66 agrees with that of the color subcarrier of the second chrominance signal.

The output from the modulation circuit 66 is limited in its band by the HPF 13 and applied to the MIX 8 and the subtracter 68 as the first chrominance signal which is the chrominance signal for still picture. The subtracter 68, by subtracting the first chrominance signal from the output from the 1 H delay circuit 4, separates the first luminance signal which is the luminance signal for still picture and provides it to the MIX 9.

The output from the multiplexing circuit 62 is also applied to the subtracters 31 and 32 of the motion detection circuit 14.

The subtracter 31 subtracts the output of the one-frame delay circuit 10 from the output of the multiplexing circuit 62 and obtains s difference of one frame. The LPF 33 limits the band of the output from the subtracter 31 and provides it to the non-linear circuit 34. As the color difference signal has one frame correlation and the phase of luminance signal is reversed for every frame during the demodulation process as described above, the frame non-correlative component of the color difference signal is obtained from the LPF 33.

If disregarding the noise effect, the frame non-correlative component is zero in case of a complete still picture and a practical value in case of a moving picture. Using the fact that the larger the motion, the larger a difference becomes in one frame, the non-linear circuit 34 converts the frame non-correlative component of the chrominance signal from the LPF 33 into the motion signal K and provides it to the MAX circuit 36. Further, the motion signal K is 0 (K=0) in case of a complete still picture and K=1 in case of a moving picture (0≦K≦1). Other operations of the motion detection circuit 14 are the same as those in the embodiment shown in FIG. 2.

Here, it is assumed that the S/N of input composite video signal is relatively deteriorated. In this case, the switches S1 through S4, S6 and S7 select the terminal b according to the selection control signal from the timing control circuit 49. As a result, the second luminance and chrominance signals that have been separated by the moving picture Y/C separation process are processed by the cyclic frame noise reduction process and are output therefrom. That is, the second chrominance signal is applied to the demodulation circuit 61 via the switch S6. After the second chrominance signal is demodulated in the demodulation circuit 61, two color difference axes signals are time-division multiplexed in the multiplexing circuit 62 and applied to the subtracters 16 and 64.

The subtracter 64 obtains a difference between the output of the multiplexing circuit 62 and its one-frame delayed signal. During the demodulation process by the demodulation circuit 61, the color difference signal has the one-frame correlation and the frame non-correlative component of the color difference signal is obtained from the subtracter 64. This frame non-correlative component of the color difference signal is applied to the limiter 20 and the LPF 21. The LPF 21 limits the band of the output from the subtracter 64 and provides it to the multiplier 23. Since the color difference signal has been converted into a low band frequency during the demodulation process, the band limit of the non-correlative component by the LPF 21 prevents an adverse effect by noise components outside the color difference signal band applied during motion detection. Other operations in the noise reduction circuit are the same as the embodiment shown in FIG. 2.

The time-division multiplexed color difference signal with noise reduced from the subtracter 19 is applied to the separation circuit 65 via the terminal 6 of the switch S7. The separation circuit 65 separates two color difference signals in the time-division multiplexed state, and the modulation circuit 66 modulates these two separated signals by two orthogonal color axes of a signal synchronized with the color subcarrier and restores it to a carrier chrominance signal. The BPF 13 limits the band of the carrier chrominance signal from the modulation circuit 66 and provides as the fifth chrominance signal via the terminal b of the switch S3.

In this case, as the signal fsc for modulation has been set at a proper phase in the phase shifting circuit 67, the phase of the color subcarrier of the fifth chrominance signal can be brought in agreement with that of the color subcarrier of the third chrominance signal.

Further, the process of the second luminance signal is the same as the embodiment shown in FIG. 2.

Thus, the same effect as in the embodiment shown in FIG. 2 can be obtained in this embodiment.

As described above, the present invention can provide an extremely preferable video signal processing circuit While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A video signal processing apparatus comprising:
   means for receiving a composite video signal;
   first separation means for separating a first luminance signal and a first chrominance signal in response to a correlation among n frames (n is a positive integer) of the composite video signal;
   second separation means for separating a second luminance signal and a second chrominance signal in response to an in-frame correlation of the composite video signal;
   means for detecting a motion of the composite video signal in response to a non-correlation among n frames (m is a positive integer) of the composite video signal, and to provide a motion detection signal therefrom;
   first mixing means for mixing the first and second luminance signals at a mixing ratio responsive to said motion detection signal so as to provide a third luminance signal therefrom;
   second mixing means for mixing said first and second chrominance signals at a mixing ratio responsive to the motion detection signal so as to provide a third chrominance signal therefrom;
   means for reducing noise in the second luminance signal and the second chrominance signal in response to the n-frame correlation, and outputting signals as a fourth luminance signal and a fourth chrominance signal; and
   a selection means for selectively outputting the third luminance signal and the third chrominance signal or the fourth luminance signal and the fourth chrominance signal.

2. A video signal processing apparatus as claimed in claim 1, wherein the selection means carries out the selection during a vertical retrace period of the composite video signal.

3. A video signal processing apparatus as claimed in claim 1, further comprising means for shifting a phase of a color subcarrier of said fourth chrominance signal so as to match a phase of a color subcarrier of said third chrominance signal.

4. A video signal processing apparatus as claimed in claim 1, wherein said first separation means and said noise reduction means share a common delay means for processing frame signals.

5. A video signal processing apparatus as claimed in claim 3, wherein said first separation means and said noise reduction means share a common delay means for processing frame signals.

6. A video signal processing apparatus as claimed in claim 1, further comprising control means for outputting the second luminance signal from said first mixing means and the second chrominance signal from said second mixing means during a n-frame period after the selection by said selection means without applying said noise reduction means.

7. A video signal processing apparatus as claimed in claim 2, further comprising control means for outputting the second luminance signal from said first mixing means and the second chrominance signal from said second mixing means during a n-frame period after the selection by said selection means without applying said noise reduction means.

8. A video signal processing apparatus as claimed in claim 4, further comprising control means for outputting the second luminance signal from said first mixing means and the second chrominance signal from said second mixing means during a n-frame period after the selection by said selection means without applying said noise reduction means.

9. A video signal processing apparatus as claimed in claim 5, further comprising control means for outputting the second luminance signal from said first mixing means and the second chrominance signal from said second mixing means during a n-frame period after the selection by said selection means without applying said noise reduction means.

* * * * *